(12) United States Patent
Liao

(10) Patent No.: US 7,599,116 B2
(45) Date of Patent: Oct. 6, 2009

(54) DISPLAY DEVICE FOR TELESCOPE SYSTEM

(75) Inventor: Chen-chen Liao, An-He Road (TW)

(73) Assignee: Asia Optical Co., Inc, Taichung (TW)

( * ) Notice: Subject to any disclaimer, the term of this patent is extended or adjusted under 35 U.S.C. 154(b) by 153 days.

(21) Appl. No.: 11/688,578

(22) Filed: Mar. 20, 2007

(65) Prior Publication Data

US 2007/0223088 A1    Sep. 27, 2007

(30) Foreign Application Priority Data

Mar. 24, 2006   (TW) ............................... 95110434 A

(51) Int. Cl.
    *G02B 23/00* (2006.01)
(52) U.S. Cl. .................. 359/399; 359/419; 359/618
(58) Field of Classification Search ................ None
    See application file for complete search history.

(56) References Cited

U.S. PATENT DOCUMENTS 5,771,623 A    6/1998  Pernstich

2005/0219690 A1*  10/2005  Lin et al. .................... 359/429
2007/0097499 A1*   5/2007  Liao .......................... 359/399

FOREIGN PATENT DOCUMENTS

| CN | 2519298 Y | 10/2002 |
| TW | 84876 | 2/1987 |
| TW | 595851 | 6/2004 |

* cited by examiner

*Primary Examiner*—Lee Fineman

(57) ABSTRACT

A display device (4) for a telescope system is disposed between a first image plane (10) and a second image plane (20) of the telescope system. The display device includes a signal emitter (41), a converging lens group (42) positioned adjacent to the signal emitter, and a dioptric imaging lens group (43) positioned adjacent to the converging lens group. The optical signal emitted by the signal emitter is first transmitted through the converging lens group, then incident onto the dioptric imaging lens group, and finally imaged onto the second image after reflection of the dioptric imaging lens group. Therefore, both the image size and brightness of the displayed signal viewed by the observer can maintain unchanged in spite of the magnification variation of the telescope system.

15 Claims, 2 Drawing Sheets

DISPLAY DEVICE FOR TELESCOPE SYSTEM

BACKGROUND OF THE INVENTION

1. Field of the Invention

The present invention relates to a display device for a telescope system, and particularly relates to a display device for a telescope system that has both range finding and electronic displaying functions 2. Description of Prior Art The optical system of a conventional telescope or sight is generally composed of an objective, an image erecting lens group, an eyepiece and a scale board with a reticle. The scale board is marked with a rough rangefinding scale. By referring to the rangefinding scale, the observer can rapidly and roughly estimate the range to a target. Therefore, such a conventional telescope or sight may be used as a simple rangefinder.

However, the range estimation by conventional telescope or sight is mostly dependent on the experience of the observer that may bring large tolerance. Accordingly, a laser telescopic sight progressively takes the place in the precise shooting and rangefinding fields. A conventional laser telescopic sight has been disclosed in U.S. Pat. No. 5,771,623 issued on Jun. 30, 1998. The conventional laser telescopic sight generally comprises an objective, a laser transmitter (such as a laser diode, LD), a laser receiver (such as an avalanche photoelectric diode, APD), a range indicator (such as a light emitting diode, LED), three sets of prisms coated with dichroic films, an image erecting lens group and an eyepiece. The laser transmitter and the laser receiver both constitute a laser rangefinder of the telescopic sight. The laser rangefinder operates on a principle of measuring a travel period from emission of a laser pulse or laser pulse sequence by the laser transmitter, via pulse reflection by a target aimed at, to reception of a reflected pulse by the laser receiver. One half of this travel period, multiplied by the constant speed of light, yields the distance between the telescopic sight and the target. The distance calculation is performed by a calculation device or program disposed within the telescopic sight.

In the conventional sight as described above, in order to see both the target image and the electronic signal that carries the distance and direction information of the target, an optical display system must be incorporated into the sight. A common telescope system generally only requires the target image to be focused onto an image plane positioned in front of the eyepiece, so that the observer can simultaneously see the target image and the electronic signal through the eyepiece. This is conventionally achieved by employment of a right angle prism, a roof prism or a Porro prism. However, for a sight system with magnification function, a magnification system must be positioned in front of the eyepiece, and the electronic signal is conventionally focused onto an image plane in front of the magnification system. This will result in variation of the image size of the electronic signal along with the magnification variation. Consequently, the magnification ratio cannot be too high, normally below 3 times, otherwise the image size of the electronic signal will be too small in case of a lower magnification, or too large in case of a higher magnification. In addition, the image position of the electronic signal also shifts with magnification variation, and the image brightness of the displayed electronic signal is also changed. This adversely affects vision feeling and electronic control.

Therefore, a display device for a telescope system is desired, which can maintain constant image size and brightness of the displayed electronic signal and which can image the electronic signal onto any position within the telescope field of view.

SUMMARY OF THE INVENTION

Accordingly, an object of the present invention is to provide a display device for a telescope system that effectively solves the conventional problems of image size and brightness variation, and image position shift of the electronic signal with magnification variation. By using the present display device for a telescope system, constant image size and brightness of the displayed electronic signal can be maintained, and the electronic signal can also be imaged onto any position within the telescope field of view.

To achieve the above object of the present invention, a display device for a telescope system in accordance with the present invention is disposed between a first image plane and a second image plane of the telescope system. The display device includes a signal emitter, a converging lens group positioned adjacent to the signal emitter, and a dioptric imaging lens group positioned adjacent to the converging lens group. The optical signal emitted by the signal emitter is first transmitted through the converging lens group, then incident onto the dioptric imaging lens group, and finally imaged onto the second image plane of the telescope system after reflection of the dioptric imaging lens group.

The dioptric imaging lens group is composed of a trapezoidal prism and a dioptric prism cemented with each other as an integral unit. The optical signal emitted by the signal emitter first passes through the converging lens group, then the trapezoidal prism and finally the dioptric imaging prism.

The dioptric prism includes a total reflection surface and a film-coating surface. The incident light beam is first reflected by the total reflection surface and then is reflected out of the dioptric prism by the film-coating surface.

Both the total reflection surface and the film-coating surface of the dioptric prism are surfaces at a 45-degree angle and are parallel with each other. The film-coating surface partially reflects the wavelengths of the signal light beam.

The trapezoidal prism of the dioptric imaging lens group has an incident surface inclined at an angle between negative 15 degrees and positive 15 degrees.

The present display device for a telescope system employs a dioptric prism having a film-coating surface that partially reflects incident light. The dioptric prism is disposed within the magnification system of the telescope system right behind the magnification lens group, that is, between the first image plane and the second image plane of the telescope system, so as to image the signal light beam emitted by the signal emitter onto the second image plane after convergence and refraction. Therefore, both the image size and brightness of the displayed signal observed by the observer maintain unchanged in spite of the magnification variation of the telescope system. In addition, the position of the signal image can be adjusted to be at any desired position within the telescope field of view during assembly of the telescope system.

BRIEF DESCRIPTION OF THE DRAWINGS

The present invention may best be understood through the following description with reference to the accompanying drawings, in which.

DETAILED DESCRIPTION OF THE PREFERRED EMBODIMENT

Figure 1:
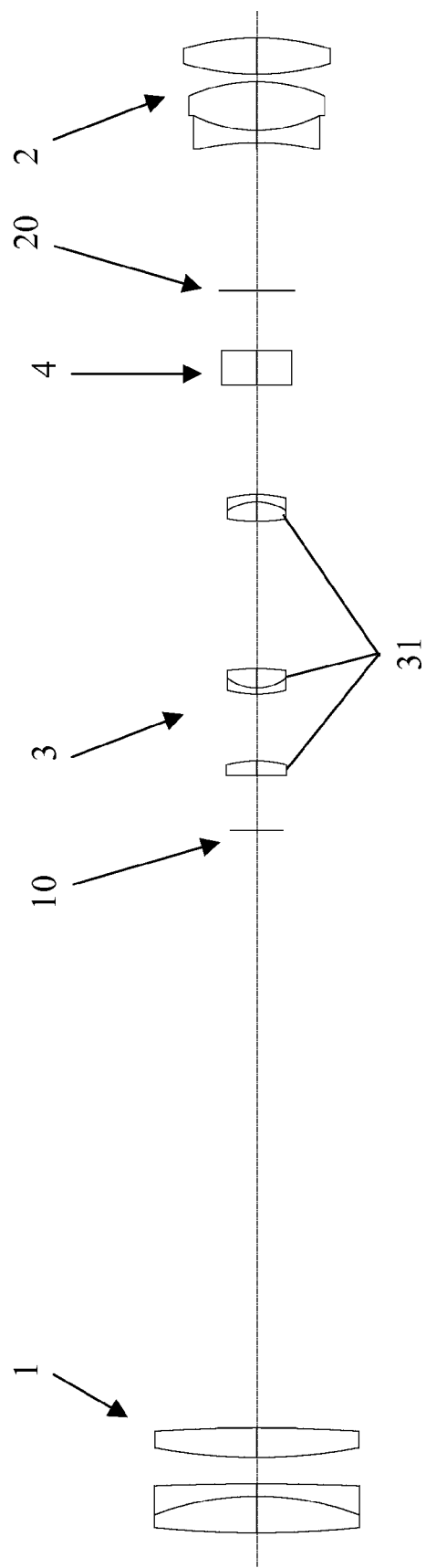
FIG. 1 shows an optical structure of a telescope system employing a display device in accordance with the present invention.

Referring to FIG. 1, a telescope system employing a display device 4 in accordance with the present invention includes an objective system 1, an eyepiece system 2, a magnification system 3 and the display device 4. The light reflected by the target to be observed is incident into the telescope system via the objective system 1, and is focused and imaged onto a first image plane 10 by the objective system 1. The light beam is further magnified and erected by the magnification system 3, and finally focused and imaged onto a second image plane 20 for observation by the observer through the eyepiece system 2. All the objective system 1, the eyepiece system 2 and the magnification system 3 may be of a conventional design, and thus a detailed description thereof is omitted herein. The display device 4 of the present invention is described in detail hereinafter.

Figure 2:
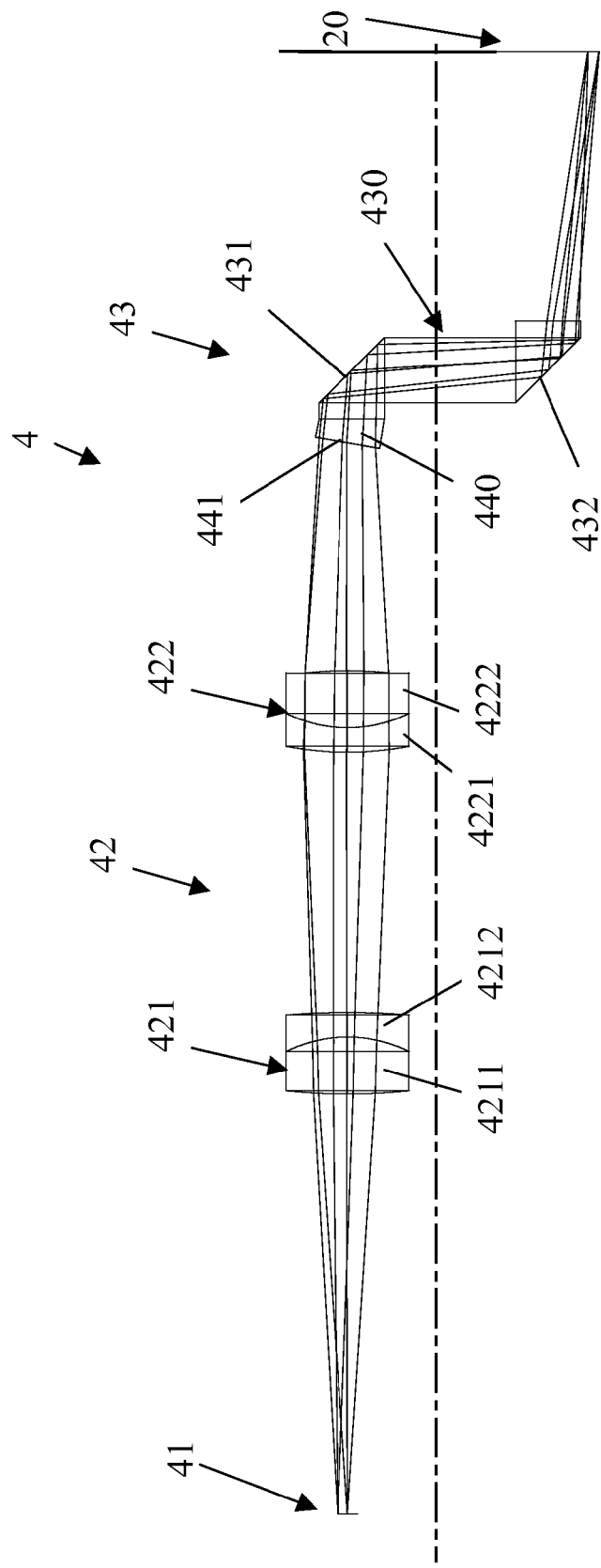
FIG. 2 is the optical structure of the display device of the present invention.

As shown in FIG. 2, the display device 4 is disposed between the first image plane 10 and the second image plane 20. In detail, the display device 4 is disposed within the magnification system 3 right behind the magnification lens group 31. The display device 4 includes a signal emitter 41, a converging lens group 42 positioned adjacent to the signal emitter 41, and a dioptric imaging lens group 43 positioned adjacent to the converging lens group 42. The signal light beam emitted by the signal emitter 41 first passes through the converging lens group 42, then is incident into the dioptric imaging lens group 43, and finally is imaged onto the second image plane 20 after reflection of the dioptric imaging lens group 43.

The dioptric imaging lens group 43 is composed of a dioptric prism 430 and a trapezoidal prism 440 cemented with each other as an integral unit. The signal light beam emitted by the signal emitter 41 sequentially passes through the converging lens group 42, then the trapezoidal prism 440 and finally the dioptric prism 430. The cemented trapezoidal prism 440 and dioptric prism 430 forms a monolithic optic to reduce the occupied space and the number of components. The dioptric prism 430 includes a total reflection surface 431 and a film-coating surface 432. Both the total reflection surface 431 and the film-coating surface 432 of the dioptric prism 430 are surfaces at a 45-degree angle and are parallel with each other. The film-coating surface 432 partially reflects the wavelengths of the signal light beam. The incident light beam is first reflected by the total reflection surface 431 and then is reflected out of the dioptric prism 430 by the film-coating surface 432.

The trapezoidal prism 440 has an incident surface 441 facing the converging lens group 42. The incident surface 441 is generally designed as an inclined surface, and its inclined angle will affect the incident angle of the signal light beam onto the second image plane 20. Since the incident angle and the image height of the signal light beam on the second image plane 20 are varied for different field of angle, the inclined angle of the incident surface 441 of the trapezoidal prism 440 must be first determined according to the desired image position, which would otherwise produce the unwanted ghost images. Because the incident angle of a light beam at the maximum image height onto the second image plane 20 is generally in a range between about 5 degrees and 8 degrees, the incident surface 441 of the trapezoidal prism 440 is inclined at an angle between negative 15 degrees and positive 15 degrees.

The converging lens group 42 includes a first converging lens 421 of positive refractive power and a second converging lens 422 of positive refractive power. The first converging lens 421, which is a compound lens, consists of a convex-plano lens 4211 having its convex surface facing the signal emitter 41 and a concave lens 4212 having its concave surface toward the signal emitter 41. The second converging lens 422, which is also a compound lens, consists of a concave lens 4221 having its concave surface facing away from the signal emitter 41 and a plano-convex lens 4222 having its convex surface also facing away from the signal emitter 41.

The present display device for a telescope system employs a dioptric prism 430 having a film-coating surface 432 that partially reflects incident light. The dioptric prism 430 is disposed within the magnification system 3 of the telescope system right behind the magnification lens group 31, that is, between the first image plane 10 and the second image plane 20 of the telescope system, so as to image the signal light beam emitted by the signal emitter 41 onto the second image plane 20 after convergence and refraction. Therefore, both the image size and brightness of the displayed signal viewed by the observer can maintain unchanged in spite of the magnification variation. In addition, the position of the signal image can be adjusted to be at any desired position within the telescope field of view during assembly of the telescope system. This is accomplished by adjusting the inclined angle of the incident surface 441 of the trapezoidal prism 440.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A display device, being disposed between a first image plane and a second image plane of a telescope system, comprising:
    a signal emitter emitting a signal to be displayed in the form of a light beam;
    a converging lens group positioned adjacent to the signal emitter for condensing the signal light beam emitted by the signal emitter; and
    a dioptric imaging lens group positioned adjacent to the converging lens group, the dioptric imaging lens group comprising a dioptric prism and a trapezoidal prism, and the dioptric prism comprising a total reflection surface and a film-coating surface;
    wherein the signal light beam emitted by the signal emitter is incident into the trapezoidal prism through the converging lens group, and the total reflection surface and the film-coating surface sequentially reflect the signal light beam onto the second image plane of the telescope system for imaging.

2. The display device as claimed in claim 1, wherein the trapezoidal prism and the dioptric prism are cemented with each other.

3. The display device as claimed in claim 1, wherein the total reflection surface and the film-coating surface of the dioptric prism are both surfaces at 45 degrees and are parallel with each other.

4. The display device as claimed in claim 3, wherein the film-coating surface of the dioptric prism partially reflects the wavelengths of the signal light beam.

5. The display device as claimed in claim 4, wherein the trapezoidal prism comprises an inclined incident surface facing the converging lens group.

6. The display device as claimed in claim 5, wherein the incident surface of the trapezoidal prism is inclined at an angle between negative 15 degrees and positive 15 degrees.

7. The display device as claimed in claim 6, wherein the converging lens group comprises a first converging lens of positive refractive power and a second converging lens of positive refractive power.

8. The display device as claimed in claim 7, wherein the first converging lens is a compound lens, and includes a convex-plano lens having a convex surface facing the signal emitter and a concave lens having a concave surface toward the signal emitter.

9. The display device as claimed in claim 8, wherein the second converging lens is a compound lens, and includes a concave lens having a concave surface facing away from the signal emitter and a plano-convex lens having a convex surface facing away from the signal emitter.

10. A telescope system having a first image plane and a second image plane, comprising:
    an objective system positioned at the front of the telescope system for receiving a light beam reflected from the target to be observed and then focusing and imaging the light beam onto the first image plane;
    a magnification system positioned in the middle of the telescope system for magnifying, erecting and finally imaging the light beam from the first image plane onto the second image plane;
    an eyepiece system positioned at the rear of the telescope system for allowing the observer to view the image on the second image plane; and
    a display device positioned between the first image plane and the second image plane, and comprising a signal emitter for emitting a signal light beam, a converging lens group positioned adjacent to the signal emitter and a dioptric imaging lens group positioned adjacent to the converging lens group, wherein the dioptric imaging lens group comprises a dioptric prism and a trapezoidal prism, and the dioptric prism comprises a total reflection surface and a film-coating surface;
    wherein the signal light beam emitted by the signal emitter is incident into the trapezoidal prism through the converging lens group, and the total reflection surface and the film-coating surface sequentially reflect the signal light beam onto the second image plane for imaging.

11. The telescope system as claimed in claim 10, wherein the trapezoidal prism and the dioptric prism are cemented with each other.

12. The telescope system as claimed in claim 10, wherein the total reflection surface and the film-coating surface of the dioptric prism are both surfaces at 45 degrees and are parallel with each other.

13. The telescope system as claimed in claim 12, wherein the film-coating surface of the dioptric prism partially reflects the wavelengths of the signal light beam.

14. The telescope system as claimed in claim 13, wherein the trapezoidal prism comprises an inclined incident surface facing the converging lens group.

15. The telescope system as claimed in claim 14, wherein the incident surface of the trapezoidal prism is inclined at an angle between negative 15 degrees and positive 15 degrees.

* * * * *